April 9, 1935.  C. B. HASKINS  1,997,176

SCALE

Filed April 10, 1931

INVENTOR
Clifford B. Haskins
BY his ATTORNEY
A.C.Maby

Patented Apr. 9, 1935

1,997,176

UNITED STATES PATENT OFFICE 1,997,176

SCALE

Clifford B. Haskins, Dayton, Ohio, assignor, by mesne assignments, to International Business Machines Corporation, New York, N. Y., a corporation of New York Application April 10, 1931, Serial No. 529,092

1 Claim. (Cl. 265—62)

This case relates to weighing scales and particularly to transmitting connections between the load support and the counterbalancing system.

An object of the invention is to provide a novel transmitting connection between the base lever system and the counterbalancing means.

More specifically, the object is to provide a novel movement multiplying connection between a counting beam and a counterbalancing mechanism.

Still more specifically, the object is to provide a novel pulley connection between two scale parts.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

Figure 1:
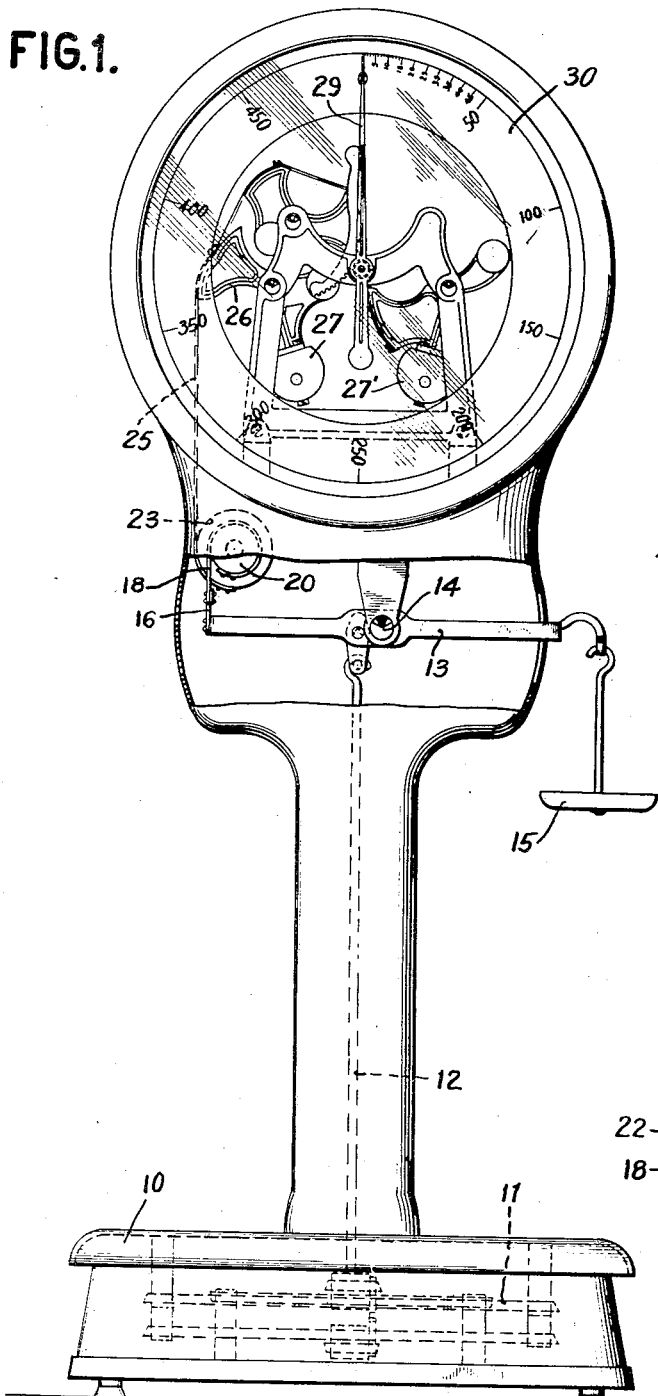
Fig. 1 is a front view of the scale with parts removed to show the interior construction.
Figure 2:
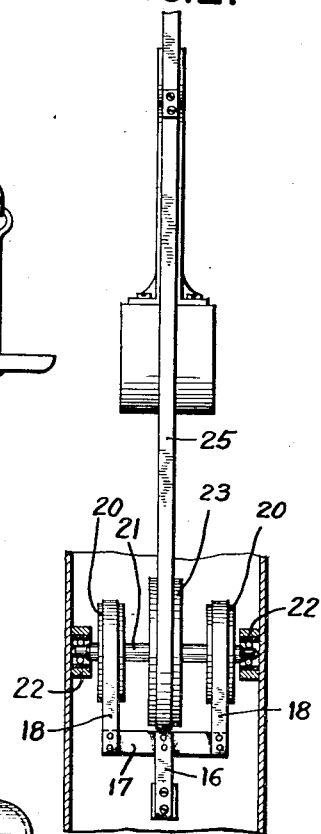
Fig. 2 is a detail view of the pulley connection between the two scale parts.

In greater detail, the scale comprises a platform 10 on which the load is placed. The platform is connected to any suitable base lever system 11 which in turn acts upon the draft rod 12 to rock an intermediate beam 13 on its pivot 14.

The right hand end of beam 13 as viewed in Fig. 1 has removably suspended therefrom a ratio pan 15. The left hand end of beam 13 is connected to a tape 16 attached through a horizontal equalizer element 17 to a pair of vertically extending tapes 18 each of which is wound around and connected to a pulley 20 fast to a shaft 21 which is journalled in bearings 22 fixed to the scale frame. Shaft 21 has fast thereto between the pulleys 20 a larger pulley 23 on which is wound a tape 25 attached at its upper end to the cam sector 26 of a pendulum 27. Connections between this pendulum 27 and a companion pendulum 27' and an indicator system is the same as disclosed in Patent No. 1,777,873.

In operation, a load placed on the platform 10 actuates the base lever system 11 and draft rod 12 to rock the beam 13 counterclockwise as viewed in Fig. 1 thereby rotating shaft 21 through pulleys 20. This causes a corresponding rotation of the larger pulley 23 to actuate the pendulum and indicator system to indicate the load on the platform.

An article placed in the ratio pan 15 rocks the beam 13 clockwise as viewed in Fig. 1 and tends to turn the indicator in a direction opposite that in which it is turned by a load on platform 10. The effect of a load on pan 15 is designed to have twenty-five times the effect of the same load when placed on platform 10; thus one article in the pan 15 will counterbalance twenty-five of the same articles on the platform 10.

For ordinary weighing purposes, the indicator 29 cooperates with dial 30 to show the total weight on platform 10. When used for counting purposes, an unknown number of articles is placed on platform 10. Enough articles are then placed in pan 15 to bring the indicator 29 to zero on the dial 30. The number of articles on the platform is then 25 times the number of articles in pan 15. Thus, if there are ten articles in the latter, there are 250 on platform 10.

The connection between the beam 13 and pendulum indicating system which comprises pulleys 20 and 23 affords a simple and novel means for multiplying the movement of the beam 13 with respect to the movement of the tape 25 connected to the pendulum system.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claim.

I claim:

In a scale, a load support, a base lever system operated thereby, automatic pendulum counterbalancing means including a power sector, an indicator driven by the pendulum means, a beam between the base lever system and the counterbalancing means, a pair of co-axially mounted pulley members, one of larger diameter than the other, a tape connection between the beam and the smaller member, and a second tape connection between the larger member and said power sector, whereby said members effect multiplication of movement of the pendulum means and the indicator with respect to movement of the beam.

CLIFFORD B. HASKINS.